United States Patent [19]
Hubbard

[11] Patent Number: 5,506,053
[45] Date of Patent: Apr. 9, 1996

[54] RADIO FREQUENCY TRANSPARENT INFRARED REFLECTIVE COATING MATERIALS AND METHODS OF MAKING THE SAME

[75] Inventor: Ronald N. Hubbard, Rancho Santa Fe, Calif.

[73] Assignee: General Atomics, San Diego, Calif.

[21] Appl. No.: 349,979

[22] Filed: Dec. 6, 1994

[51] Int. Cl.$^6$ .................................................. B32B 15/00
[52] U.S. Cl. .................... 428/402; 428/402.24; 428/403; 428/404; 428/406; 428/407
[58] Field of Search ................................... 428/402, 403, 428/404, 406, 407

[56] References Cited

U.S. PATENT DOCUMENTS

| | | | |
|---|---|---|---|
| 4,593,007 | 6/1986 | Novinski | 501/105 |
| 4,711,814 | 12/1987 | Teichmann | 428/403 |
| 5,204,163 | 4/1993 | Nakatsuka et al. | 428/195 |
| 5,366,664 | 11/1994 | Varadan et al. | 428/402 |

Primary Examiner—Patrick J. Ryan
Assistant Examiner—Kam F. Lee
Attorney, Agent, or Firm—Juettner Pyle Lloyd & Piontek

[57] ABSTRACT

Infrared (IR) reflective radio frequency (RF) transparent coating materials are comprised of coated microspheres dispersed as discrete pigment particles in an IR and RF transparent film forming binder. Each microsphere is comprised of a dielectric core, a layer of IR reflective RF conductive material on the core, and an IR and RF transparent layer of insulating material coated over and encapsulating the reflective layer. The insulating layer prohibits transmission of currents between the conductive layers and the spheres are of sufficiently small size in relation to RF wavelengths as to permit passage of RF energy through the coating. The coated microspheres are visually colored, and being spherical, provide on a coated object a film or coating that is visually colored and highly diffuse, as well as being IR reflective and RF transparent. Methods of making the discrete spherical pigment particles comprise the steps of levitating microspheres in a coating deposition chamber and depositing onto the levitated spheres the desired coating or coatings.

8 Claims, 1 Drawing Sheet

U.S. Patent
Apr. 9, 1996
5,506,053
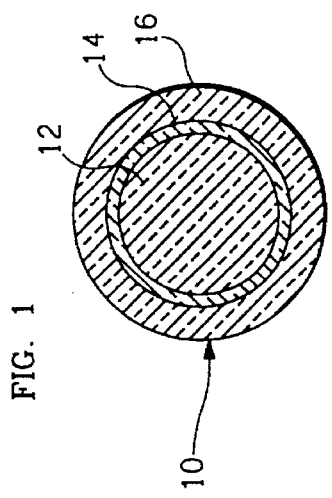
FIG. 1
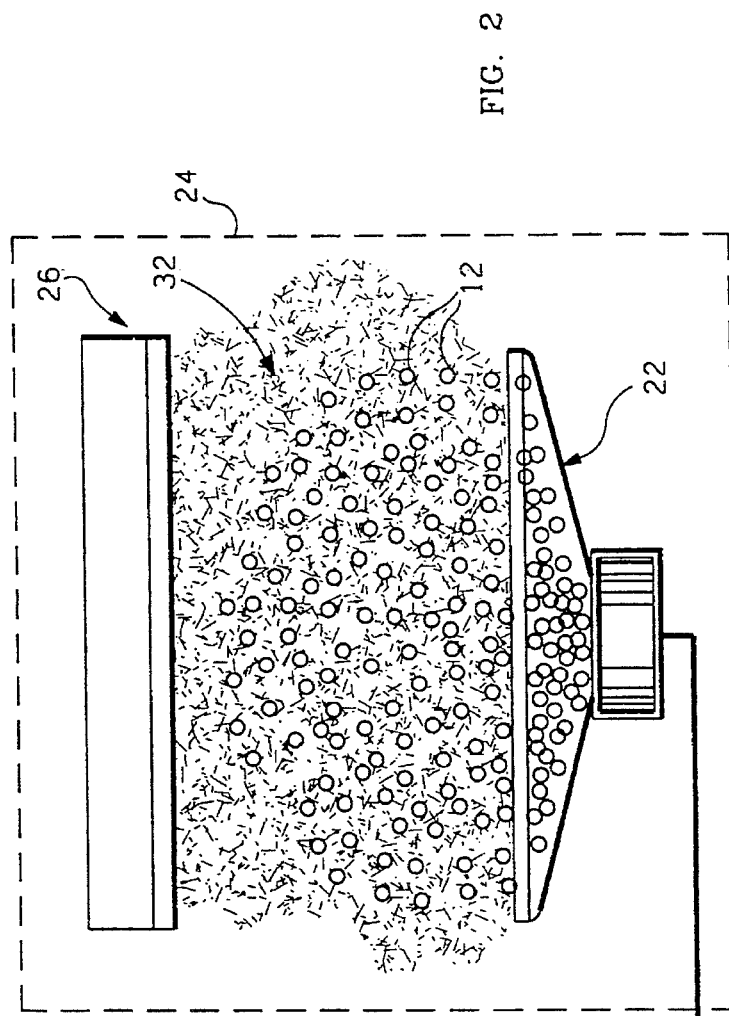
FIG. 2
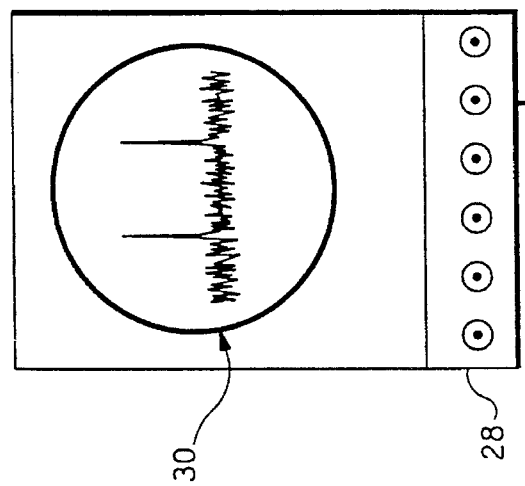

RADIO FREQUENCY TRANSPARENT INFRARED REFLECTIVE COATING MATERIALS AND METHODS OF MAKING THE SAME

FIELD OF THE INVENTION

The present invention relates to infrared reflective coatings and coating materials, and particularly coatings that are infrared reflective, radio frequency transparent, visually colored and diffuse.

BACKGROUND

Optical interference filter technology has provided films and/or coatings that are radio frequency (RF) transparent and infrared (IR) reflective. Currently, thin film multi-layer dielectric stacks are used for IR reflection and RF transparency. However, practical available IR reflecting dielectric materials are specular in their visual appearance.

Dielectric spheres have been coated with metal for use in polymer coatings requiring electrically conductive properties. These spheres have not been used as IR reflective pigments for signature control, because their high RF reflectance makes them unsuitable for many applications, for example, applications requiring IR treatment over radar absorbing materials. Also, the bright coated spheres are highly reflective in the visual spectrum.

It would be desirable to have coating materials which, when applied as a coating to an object such as a military system, will be IR reflective, RF transparent, visually colored and nonspecular.

The object of the invention is to provide infrared reflective coatings and coating materials having the desired characteristics.

SUMMARY OF THE INVENTION

One object of the invention is to provide coating materials, usable like paint, that are formulated in such manner as to be reflective in the infrared wavelengths, transparent in the radio frequency wavelengths, visually colored, and highly diffuse.

Another object of the invention is provide particulate matter, i.e., pigments, for the formulation of such coatings.

In the preferred embodiment, the invention may be said to reside in two aspects; first, the production of pigments that are visually colored and IR reflective; and second, the application of these pigments in such fashion that they become radio frequency transparent and visually diffuse.

According to the first aspect of the invention, visually colored and IR reflective pigments are comprised of dielectric microspheres each coated with a thin film of IR reflective material and a visually colored IR and RF transparent insulating material.

According to the second aspect of the invention, the spherical pigments are dispersed in an IR and RF transparent film forming binder to make a coating material similar to paint. The spheres are of very small size compared to the wavelengths of RF energy, and the reflective material on each sphere is surrounded by insulating material so that when the spheres are dispersed within the binder the currents that can be driven between and among the spheres are minimal. Consequently, when the coating material is applied to an object or a substrate, the RF energy will pass through the film or coating. Also, because the pigment particles are spherical, the coating will be highly diffuse.

Thus, radio frequency transparent and infrared reflective coatings with diffuse visual coloration are conveniently and economically produced.

In practice of the preferred embodiment of the method of the invention, discrete particulate pigments are formed by levitation of metal coated dielectric microspheres and deposition on the levitated spheres of an IR and RF transparent insulating coating. The individual coated spheres are then dispersed in a binder at a concentration sufficient to provide a coating material of the desired characteristics above described, i.e., that is IR reflective, RF transparent, visually colored and diffuse.

The invention thus provides economical and practical modes of making the highly advantageous IR reflective coatings of the invention.

These and other objects and advantages of the invention will become more readily apparent from the following detailed description as considered in conjunction with the accompanying drawings.

BRIEF DESCRIPTION OF THE DRAWINGS

FIG. 1 is a cross section, on a greatly magnified scale, of a coated microsphere comprising the discrete pigment particle of the invention; and FIG. 2 is a schematic illustration of one manner of coating microspheres for use in practice of the invention.

DETAILED DESCRIPTION

The following is a detailed description of a preferred embodiment of the invention which is presently deemed by the inventor to be the best mode of carrying out his invention.

Referring to FIG. 1, the multi-layer pigment particle 10 of the preferred embodiment of the invention is comprised of a spherical, RF transparent, dielectric core 12, a thin layer 14 of an IR reflective RF conductive material coated onto the core 10, and an IR and RF transparent layer 16 of electrically insulating material coated over and encapsulating the layer 14.

The RF transparent dielectric core 12 is preferably a microsphere formed of an RF transparent, electrically insulating material. The microsphere may be visually and infrared transparent or opaque and may be solid or hollow. Microspheres and microballoons suitable for the propose, made of glass, a polymer or some other dielectric, are available from various sources in a size range of 5 to 100 microns.

The IR reflective electrically conductive layer 14 may be any one of several materials, such as metals and metal oxides, including gold, silver, indium oxide, tin oxide, and indium tin oxide (ITO). Gold or silver layers would typically be in the order of 100 Å to 300 Å or more thick, and an oxide layer would typically be about 2,000 Å thick, thereby to provide IR energy reflectance of 80 to 98%.

As noted in the Background, metal coated microspheres are commercially available for use in electrically conductive polymer coatings. Such metal coated spheres are suitable for use in practice of the invention, and they eliminate the need for a separate metal coating step in order to produce the pigment particle 10 of the invention. Silver coated microspheres and microballoons are especially useful because of the high IR reflectance of silver.

The IR and RF transparent insulating top coat 16 may be selected from a variety of materials including germanium, silicon, alumina, oxides of nickel and chromium, yttria and zirconium oxides, calcium fluoride, zinc sulfide, arsenic triselenide, gallium arsenide, zinc selenide, potassium chloride, etc. The thickness of the coating may range from about 500 to 10,000 Å.

The reflective layer 14 and encapsulating top coat 16 are selected and applied at respective thicknesses to impart a desired visual coloration to the sphere 10, e.g., black, gray, blue, tan, orange, etc. For example, commercially available silver coated spheres may be coated with germanium or nickel oxide to produce a black sphere; with silicon to produce an orange sphere; or with chromium oxide to produce a green sphere. Variations in the thickness of the coating will produce variations in the colorations. Other materials for the top coat 16 will produce other colors. Spheres of different colors may be mixed together in a liquid carrier to produce still other colors, the same as with conventional paints. Also, to achieve additional colorations, the IR reflecting pigments of the invention can be mixed in a liquid carrier with non-IR reflecting pigments, provided the resultant reduction in IR reflectance is not excessive.

Because the top coating 16 is RF transparent, it would normally be anticipated that the conductive layer 14 would reflect RF energy as well as IR energy. However, in accordance with the invention, RF transparency and additional objectives of the invention are achieved by (1) using individual pigment particles 10 of spherical shape; (2) dispersing a plurality of the spherical pigment particles 10 in an IR and RF transparent film forming liquid carrier or binder to make a coating material, i.e., a paint; (3) insulating the pigment particles from one another by the coating 16; (4) employing pigment particles of small size in relation to the wavelengths of RF energy; and (5) imparting visual coloration to the pigment particles. The resultant coating material or paint thus comprises a dispersion of discrete, insulated, visually colored, spherical pigment particles in a fluid matrix. Since each pigment particle is a discrete particle of small size compared to the wavelengths of RF energy, and the metal layer in each particle is surrounded by insulation, only minimal currents can be driven in the metal and RF energy will therefore pass through the coating material or paint.

Consequently, when the paint is applied to an object and permitted to dry, the resultant film or coating will be visually colored, RF transparent and IR reflective. Moreover, since the pigment particles are individual spheres, the applied coating will be visually diffuse and nonspecular.

The liquid carrier or film forming binder for the coating material may be polystyrene or one of a number of polyurethanes. The size of the pigment particles and the concentration of the particles in the binder must of course be sufficient to reflect IR energy. Generally, the discrete spheres should fall within the size range of 5 to 500 microns. Typical concentrations of the coated microspheres in the liquid matrix are 50–70% by volume, but the concentration may be varied depending upon the result to be achieved.

Coating of the spheres may be accomplished in any manner conventional for the application of the particular coating material to be employed, e.g., liquid coating, fluidized bed coating, monomer atomization/polymerization, vapor deposition, sputter deposition, etc. In current practice of the present invention, precoated metalized spheres are employed as the starting material and application of the insulating coating 16 is preferably accomplished by levitation of the spheres within a bell jar sputtering system having a magnetron sputtering cathode mounted in the top for downward sputtering onto the levitated spheres, as illustrated schematically in FIG. 2. The spheres may be levitated by acoustical levitation or by the well-known fluidized bed technique. In the apparatus illustrated in FIG. 2, acoustic levitation is employed.

Referring to FIG. 2, microspheres 12, preferably metal coated glass microballoons, are placed in an upwardly directed acoustic levitator 22, such as an acoustic speaker, e.g., a woofer, which is mounted in the lower regions of a vacuum sputtering chamber, indicated schematically by the dotted line 24. A planar magnetron sputtering cathode 26 is mounted in the upper regions of the chamber for downward sputtering of coatings onto the levitated spheres. An electrical driver for the levitator, indicated at 28, is equipped with an oscilloscope 30 which provides a visual read-out of the driving forces. As illustrated on the scope 30 in FIG. 2, the driving forces comprise a steady low frequency tone and an intermittent acoustic pulse. The steady low frequency tone is utilized to levitate and vibrate the spheres in the form of a cloud 32 between the speaker and the sputtering cathode. The sides of the levitator (speaker) are sloped downward to lead to the center so that the spheres will roll to the center then be bounced up and out in a pulsating cloud. The intermittent acoustic pulse is employed to cause a periodic jump in the cloud of spheres. Consequently, sufficient agitation and movement is imparted to the spheres to insure uniform coating of the entire surface of the spheres by the downwardly sputtered coating materials.

In current practice, a target of the selected insulating material is mounted on the lower surface of the cathode 26 and sputtering is carried out in the conventional manner to deposit on each of the metal coated and levitated spheres a uniform overall layer 16 of insulating material. Sputtering is carried out for a duration of time sufficient to build up on each sphere a layer 16 of insulating material that is of the desired thickness and that substantially completely encapsulates and isolates the conductive metal layer 14. Thus, when dispersed in a fluid matrix, the metal layers are insulated one from another.

It is, of course, not essential to use precoated metallized spheres in practice of the invention, If desired, uncoated microspheres or microballoons of glass, a polymer or another dielectric may suitably be coated in a two stage operation. In that event, in the first stage, a target of the selected IR reflective material is mounted on the lower surface of the cathode 26 and sputtering is carried out in the conventional manner to deposit on each of the levitated spheres 12 a uniform overall layer 14 of the reflective material. In the second stage, a target of the selected insulating material is mounted on the lower surface of the cathode and sputtered as above described to deposit on each of the reflectively coated spheres a uniform overall layer 16 of insulating material that substantially completely encapsulates and isolates the conductive layer 14.

If employed, the two stage coating process may be carried out sequentially in a single apparatus, as illustrated in FIG. 2, or two such apparatuses may be employed for applying respective ones of the two coating materials. In either event, the spheres are effectively and efficiently coated with the selected materials.

After formation, the coated microspheres are dispersed at a proper concentration in an appropriate film forming binder, as is conventional in the coating materials art, to provide a coating material which, when applied to an object to be IR shielded, is infrared reflective, radio frequency transparent, visually colored and highly diffuse.

The objects and advantages of the invention have thus been shown to be attained in a convenient, economical and practical manner.

While certain preferred embodiments of the invention have been herein illustrated and described, it is to be appreciated that various changes, rearrangements and modifications may be made therein without departing from the scope of the invention, as defined by the appended claims.

What is claimed is:

1. A radio frequency transparent infrared reflecting coating material comprising:

an infrared and radio frequency transparent film forming binder, and discrete spheres dispersed in the film forming binder, each sphere being of small size relative to radio frequency wavelengths, not greater than about 500 microns, and comprising a radio frequency transparent core, a layer of infrared reflective material on the exterior surface of the core, and a layer of infrared and radio frequency transparent insulating material overlying and encapsulating the layer of reflective material, the layer of insulating material encapsulating the layer of reflective material on each sphere substantially isolating the layer of reflective material on the respective sphere from the layer of reflective material on the other spheres such that when the coating material is applied to an object the coating is infrared reflective and radio frequency transparent.

2. A coating material as set forth in claim 1 wherein the spheres are visually colored and when applied to an object provide a coating that is visually colored and diffuse.

3. A coating material as set forth in claim 1 wherein the layer of reflective material on at least some of the spheres is comprised of silver or gold and has a thickness of at least about 100 Å.

4. A coating material as set forth in claim 1 wherein the layer of reflective material on at least some of the spheres is comprised of indium oxide, tin oxide or indium tin oxide and has a thickness in the order of about 2,000 Å.

5. A coating material as set forth in claim 1 wherein the layer of material encapsulating the layer of reflective material on each of the spheres has a thickness in the order of from about 500 Å to about 10,000 Å, and is selected from the group of materials including germanium, silicon, alumina, oxides of nickel and chromium, yttria and zirconium oxides, calcium fluoride, zinc sulfide, arsenic triselenide, gallium arsenide, zinc selenide, and potassium chloride.

6. A coating material as set forth in claim 1 wherein the concentration of the spheres in the film forming binder is in the order of from about 50% to about 70% by volume.

7. A coating material as set forth in claim 1 wherein each radio frequency transparent core comprises a microsphere or microballoon made of glass, a polymer or a dielectric.

8. A coating material as set forth in claim 1 wherein the film forming binder comprises polystyrene or a polyurethane.

* * * * *